Oct. 23, 1951     J. F. SEBALD     2,572,527
DEAERATOR

Filed May 2, 1945     5 Sheets-Sheet 1

Joseph F. Sebald
INVENTOR

BY
ATTORNEY

Oct. 23, 1951     J. F. SEBALD     2,572,527
DEAERATOR

Filed May 2, 1945     5 Sheets-Sheet 2

Joseph F. Sebald
INVENTOR
BY
ATTORNEY

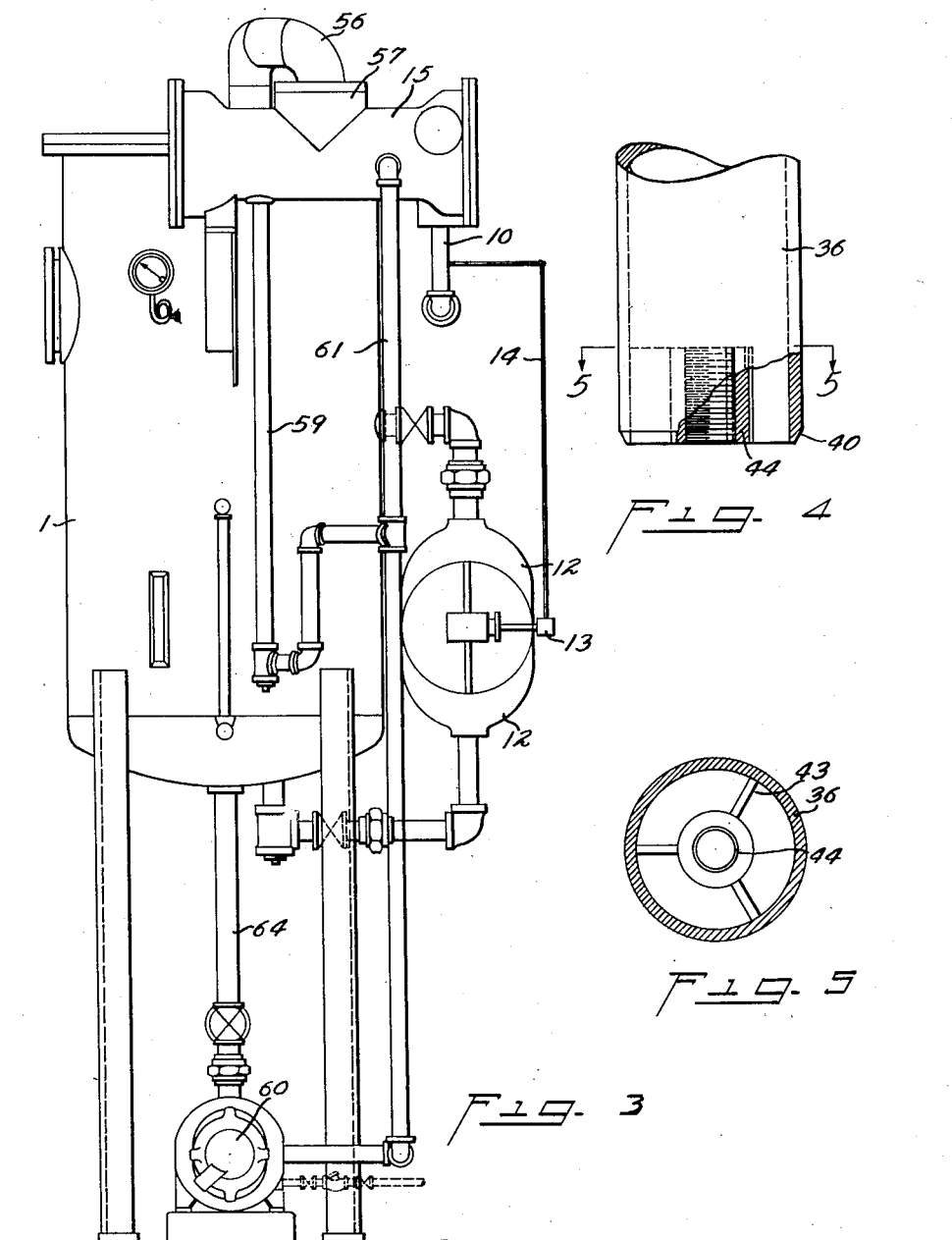

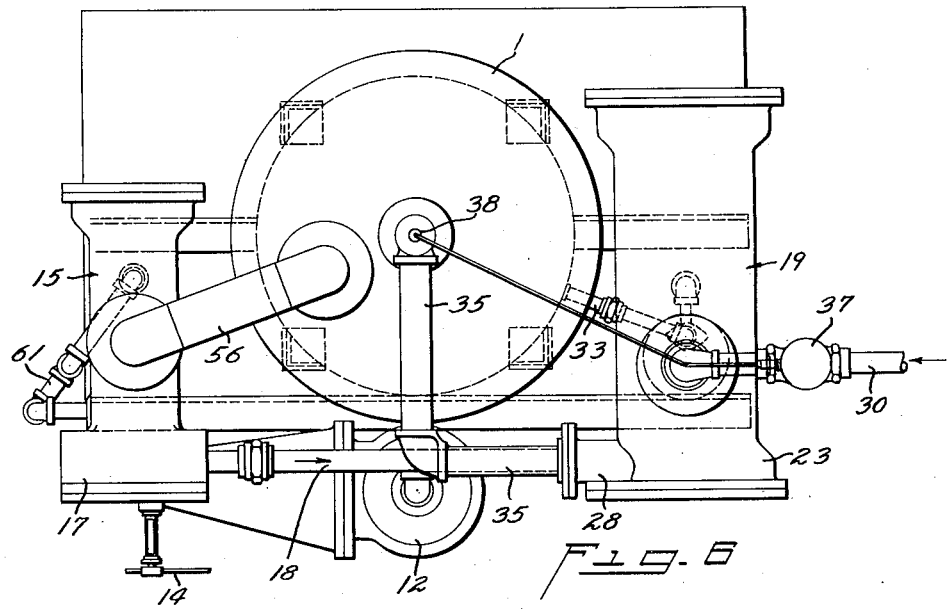
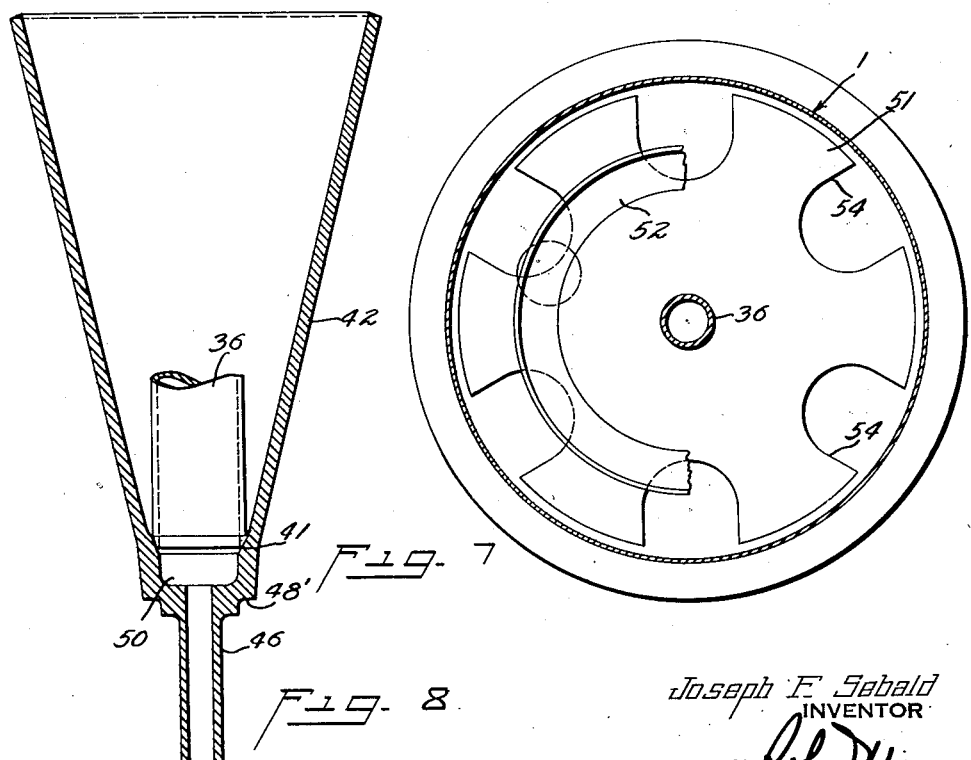

Oct. 23, 1951  J. F. SEBALD  2,572,527
DEAERATOR

Filed May 2, 1945  5 Sheets-Sheet 5

Joseph F. Sebald
INVENTOR
BY
ATTORNEY

Patented Oct. 23, 1951

2,572,527

UNITED STATES PATENT OFFICE 2,572,527

DEAERATOR

Joseph F. Sebald, Bloomfield, N. J., assignor to Worthington Pump and Machinery Corporation, Harrison, N. J., a corporation of Delaware Application May 2, 1945, Serial No. 591,611

3 Claims. (Cl. 183—2.5)

This invention relates to a method of an apparatus for deaerating various liquids such as water, fruit juices, vegetable juices, etc., and embodies essentially deaeration by flashing the liquid to lower temperatures and pressures.

There are many instances where deaeration of liquid is desirable, but because of the lack of available steam, desire for saving of fuel with consequent monetary savings, or where it is undesirable to heat the liquid to be deaerated to a high temperature, methods of deaeration such as is employed in deaerating heaters as disclosed in my prior Patents Nos. 2,308,719, January 19, 1943; 2,308,720, January 19, 1943; and 2,308,721, January 19, 1943, are not desirable or practical, and the present invention relates to a deaerator and method of deaeration whereby the non-condensible gases may be removed from liquids with the heating of the liquids to temperatures which are quite low in comparison with the temperatures involved in the processes of the above-identified patents; that is, in the instance where liquids such as fruit juices, vegetable juices, etc. are to be deaerated this action may be accomplished without heating the liquids to a temperature sufficiently high to destroy or affect their taste, vitamin content, or organic conditions.

It is an object of the present invention to provide a method of deaeration of liquids and an apparatus therefor wherein the liquid is raised in temperature to a degree far below its flashing point at atmospheric pressure, and is then delivered into a flash deaeration chamber in which a pressure is maintained by any suitable vacuum-producing means to correspond to a slightly lower temperature than that at which the liquid enters the flash chamber, resulting in a predetermined degree loss of sensible heat from the fluid. The loss in sensible heat flashes off small portions of condensible vapor which carries with it non-condensible gases. The flashed vapor, non-condensible gases, and liquid is subjected to a scrubbing action, and they are discharged at relatively high velocity against suitable impingement means and separation of the vapors, and non-condensible gases from the liquid is effected.

Final separation is provided by causing the liquid to flow in a thin film to a suitable storage space, while the condensible vapors and non-condensible gases are passed through suitable condensing means to effect condensation of the condensible vapors while the non-condensible gases are taken off.

Another object of the present invention is to provide a deaerating apparatus as specified which is constructed and designed for accessibility and ease of cleaning of its various parts, as well as for design simplicity, so that when employed for deaerating or degasifying vegetable or fruit juices to be used as food products, the device can be readily sterilized to prevent contamination of the juices being treated.

Another object of the present invention is the provision of a deaerating apparatus as specified which is constructed and arranged so that the velocity of flow of the liquid being treated through the device will be relatively constant and independent of the load or quantity of liquid flowing through the device.

With these and other objects in view, as may appear from the accompanying specification, the invention consists of various features of construction and combination of parts, which will be first described in connection with the accompanying drawings, showing a deaerator of a preferred form embodying the invention, and the features forming the invention will be specifically pointed out in the claims.

In the drawings:

Figure 3 is a side elevation of the apparatus looking at it from a point at right angles to the elevation shown in Figure 2.

Figure 4 is a detail view partly in section of the influent or fluid feeding pipe.

Figure 5 is a cross-section on the line 5—5 of Figure 4.

Figure 6 is a top plan of the improved deaerat- apparatus.

Figure 7 is a horizontal section taken on the line 7—7 of Figure 1.

Figure 8 is an enlarged fragmentary section of the spray member or inverted spray-cone by means of which the liquid to be treated is sprayed into the flash chamber.

Referring more particularly to the drawings, the improved deaerating apparatus comprises a receptacle 1 having in the upper portion thereof a flashing or deaeration chamber 2, and in the bottom thereof a storage space 3 for deaerated liquid.

Since the deaerator of the present invention is particularly adapted for the deaeration of fruit juices, vegetable juices, or like food products, the entire top of the receptacle 1 is open and is closed by a removable closure plate 4 so that this closure plate 4 may be removed to permit ready access to the interior of the receptacle 1 for sterilizing or thorough cleaning of all of the parts of the deaerating apparatus contained within the receptacle.

Figure 9:
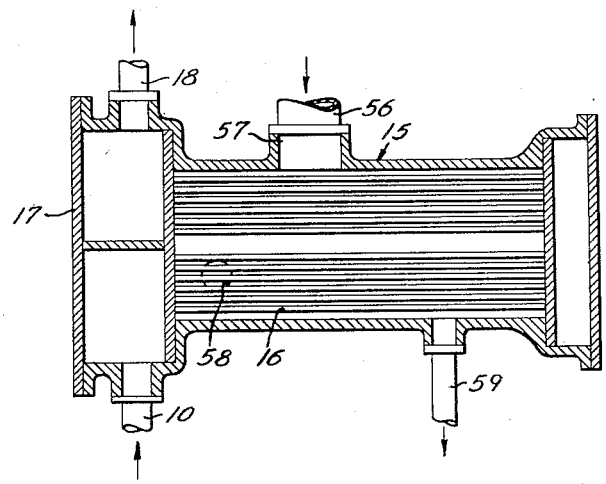
Figure 9 is a horizontal section through a vent condenser employed in the apparatus and taken on the line 9—9 of Figure 1.
Figure 10:
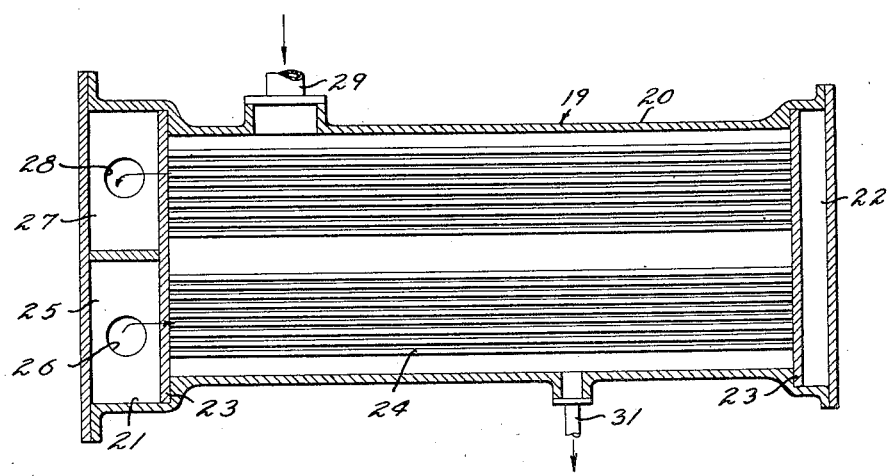
Figure 10 is a vertical longitudinal section through a pre-heater employed in the apparatus and taken on the line 10—10 of Figure 1.

The liquid to be deaerated passes from a suitable source (not shown) through the inlet pipe 10 in which is located a valve structure 11 of any approved construction. The valve 11 is operated from a float valve structure 12 of any approved construction which has communication with the interior of the recepacle 1 so that the float (not shown) of this mecnanism will be moved by variations in the level of treated fluid in the storage compartment 3 of the apparatus. Movement of the float will actuate the lever 13, which will, in turn, operate the valve 11 through the connection 14, and thus the flow of fluid to be treated to the apparatus will be controlled by the level of the treated fluid in the storage compartment 3. From the fluid inlet pipe 10, the liquid to be treated enters the vent condenser 15 which is shown in section in Figure 9 of the drawings.

The liquid to be treated flows in a two pass flow through the tubes 16 of the vent condenser, and returning to the inlet box 17 thereof flows outwardly through the outlet pipe 18 into the pre-heater 19. The pre-heater 19 is of the surface type like the vent condenser 15, that is, it comprises a shell 20 having a combined inlet and outlet box 21 at one end, a reverse flow box 22 at the opposite end, which boxes are segregated from the interior of the shell by tube heads 23. Tubes 24 extend between the tube heads and establish communications between the boxes 21 and 22.

The liquid to be treated enters the inlet section 25 of the box 21 through its inlet 26 and flows through a portion of the tubes 24 into the box 22 where it reverses its flow through the remaining portion of the tubes into the outlet section 27 of the box 21, flowing therefrom through the outlet 28. The liquid to be treated is heated in the pre-heater 19 to the desired temperature, namely, a temperature far below its flashing point at atmospheric pressure, by means of steam which enters the interior of the shell 20 about the tubes 24 through the steam inlet 29. Steam is supplied to the inlet 29 from any suitable source (not shown) through the steam inlet pipe 30, and such steam as is condensed in the heater 19 is drawn off through an outlet 31 into a trap 32 from which a part of the condensed steam is drawn into the flash chamber 2 within the receptacle 1 by the vacuum therein which is created in the manner hereinabove described, through the branch pipe 33 to make up or replace any desired portion of the water taken out of the liquid being treated by the deaeration or degasifying operation. Any desired portion of the condensate may be taken off through a suitable outlet pipe 34.

From the outlet 28 of the pre-heater 19, the liquid to be treated flows through a suitable pipe 35 into the inlet pipe 36 which extends downwardly into the deaerating or flash chamber 2 within the receptacle 1.

The quantity of steam delivered to the pre-heater 19, and, consequently, the temperature of the liquid delivered to the inlet pipe 36 is controlled by the temperature of the fluid in the inlet pipe through the medium of a thermal-actuated valve 37 of any approved type which may be purchased upon the open market. The thermal-actuated valve 37 is operated by the thermal bulb 38 which extends into the pipe 36 in the usual manner of the operation of such valves.

The pipe 36 has a valve-forming surface 40 as shown in Figure 4 formed on its inner outlet end which co-operates with a companion valve surface formed on the inner wall of the inverted spray-cone 42. A spider 43 as shown in Figure 5 which supports a threaded sleeve 44 is positioned within the lower outlet end of the inlet pipe 36. A supporting rod 45 has one end threaded into the sleeve 44 and the other end extending downwardly through and out of the sleeve 46 formed on the apex of the inverted spray-cone 42. A spring 47 is coiled about the sleeve 46, and one end of this spring engages against a suitable abutment 48' formed at the apex of the inverted spray-cone 42, while the other end of the spring engages against a tensioning plate 48 slidably carried by the rod 45. A nut 49 is threaded on the outer end of the rod 45 for tensioning the spring 47.

The inverted spray-cone 42 is supported wholly on the inlet pipe 36 by means of the rod 45, and, therefore, it is free to move longitudinally relative to the inlet pipe 36, being prevented from wobbling or lateral movement by the rod 45. When there is no liquid flowing through the pipe 36, the spring 47 will act to hold the valve surface 41 of cone 42 as shown in Figure 7 against the valve surface 40, closing the end of the inlet pipe 36 except to the relatively small space 50 within the cone below the valve surface 41. The spring 47 is tensioned to control the pressure of the influent, or the fluid flowing into the receptacle 1, and until such time as the pressure of the incoming fluid exceeds the pressure exerted by the tensioning of the spring 47, the valve surface 41 and 40 will be maintained in contact. However, when the pressure of the incoming liquid to be treated exceeds the tension of the spring 47, the inverted spray-cone 42 will be forced downwardly against the tension of the spring 47, providing an opening between the valve surface 41 and 40 through which the incoming fluid may flow upwardly into the inverted spray-cone 42. Thus the spring 47 acts to maintain the velocity flow of liquid being treated through the device relatively constant and independent of the load or quantity of fluid flowing through the device.

The liquid to be treated flowing upwardly through the inverted spray-cone 42 at a predetermined substantially constant velocity is projected from the spray-cone against an impingement surface formed by the substantially conical baffle 51 and the flaring skirt baffle 52.

A pressure is maintained in the flash chamber 2 into which the liquid is projected from the inverted spray-cone 42 to correspond to a slightly lower temperature than that at which the liquid enters the flash chamber, resulting in a predetermined degree loss of sensible heat from the fluid. The loss of the sensible heat and the projection of the liquid at a relatively high velocity against the impingement baffles 51 and 52 causes a flashing of small portions of condensible vapor from the liquid which carries with it non-condensible gases.

The liquid is subjected to a scrubbing action during its passage through the inverted spray-cone and its contact with the impingement baffles 51 and 52 which further facilitates the release of the non-condensible gases.

The fluid, after impingement against a portion of the baffle 51 and against the skirt baffle 52, is directed downwardly in a thin film both by the skirt baffle 52 and by an inwardly flaring baffle 53 positioned between the flash chamber 2 and the storage space 3. This baffle 53 which inclines inwardly towards the axis of the receptacle 1 as it extends downwardly causes the liquid to flow in a thin film to the storage space 3.

Figure 1:
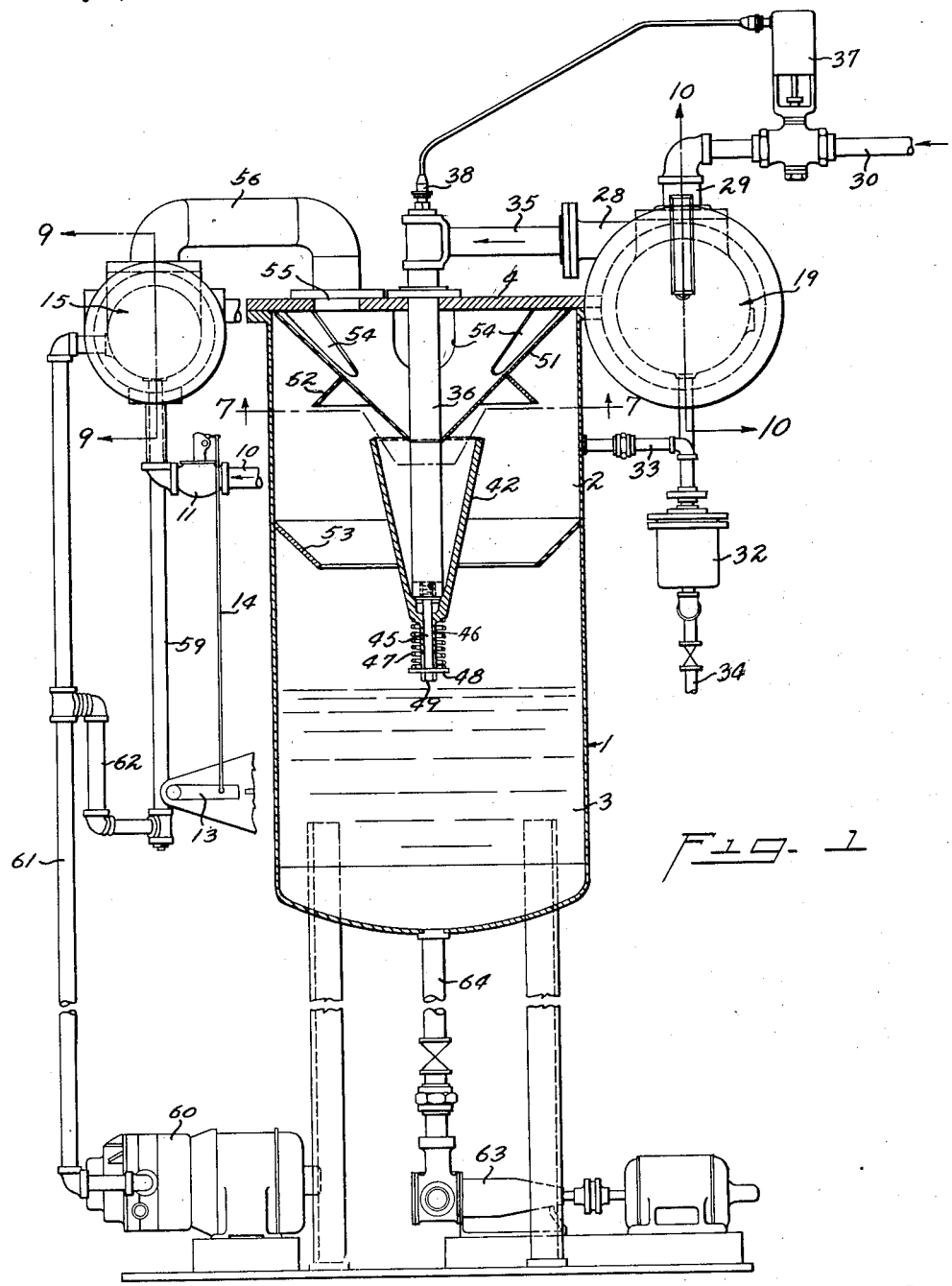
Figure 1 is a view partly in side elevation and partly in section through the deaerating apparatus.
Figure 2:
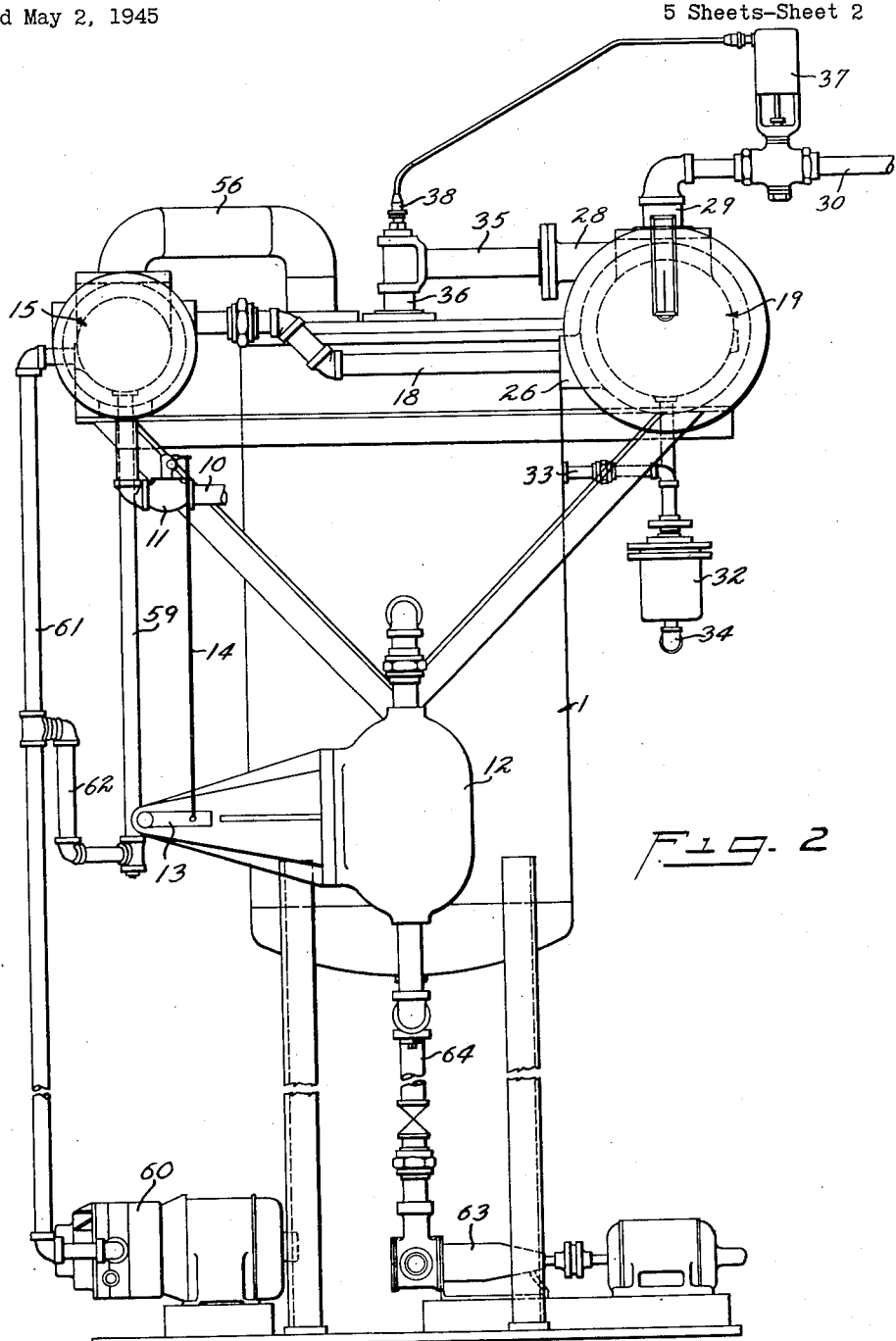
Figure 2 is a side elevation of the apparatus.

The condensible vapor and non-condensible gases pass around the edge of the skirt baffle 52 and upwardly through openings 54 formed in the impingement baffle 51. As clearly shown in Figure 1 of the drawings, the impingement baffle has its lower end fitting snugly about the inlet pipe 36, and it extends upwardly to the inner surface of the cover 4, forming a compartment within the interior of the baffle 51 which is separated or cut off from the flash chamber 2 except for the openings 54. The openings 54 extend downwardly in the baffle 51 only to substantially the point where the skirt baffle 52 is connected to the outer surface of the baffle 51. From the chamber or space within the baffle 51, the condensible vapors and non-condensible gases are drawn off through an outlet 55 and suitable pipe 56 into the vent condenser 15 through the vapor inlet 57 to the vent condenser. The condensible vapors are condensed in the vent condenser 15 by the fluid to be treated which flows through the tubes 16 of the vent condenser on its way to the pre-heater 19. The non-condensible gases are drawn off from the vent condenser 15 in any suitable manner through an outlet 58, while the condensed liquid flows outwardly through the outlet pipe 59 and serves as the liquid medium of the vacuum pump 60.

The vacuum pump 60 is of the well-known liquid and gas vacuum pump type as manufactured by the Nash Engineering Company, and as disclosed in U. S. Patents Nos. 953,222, March 29, 1910; 1,803,885, May 5, 1931; and 1,446,903, February 27, 1923. The vacuum pump 60 has its suction connected by a suitable pipe 61 to the interior of the vent condenser 15, and from the vent condenser 15 to the flashing chamber 2 through the vent condenser, pipe 56, outlet 55, and openings 54 so that a vacuum may be effected in the flash chamber 2 to provide the desired predetermined pressure in the flash chamber which will be the desired pressure below the temperature of the incoming fluid to cause the vaporization of a part of the incoming fluid together with the release of the non-condensible gases. A suitable U-leg 62 is provided in the pipe 59 so as to provide a sufficient storage space and insure the delivery of the necessary and proper amount of liquid to the vacuum pump 60 to enable it to maintain its vacuum pumping action.

The treated liquid is drawn off from the storage compartment 3 by a tail pump 63 through a suitable pipe connection 64. The tail pump 63 is of any approved construction which may be purchased upon the open market and which will pump against a vacuum so as to prevent breaking of the vacuum and the consequent rising of pressure in the flash chamber 2 by the withdrawing of the treated liquid.

It will be understood that the invention is not to be limited to the specific construcion or arrangement of parts shown, but that they may be widely modified within the invention defined by the claims.

What is claimed is:

1. In a low pressure, low temperature deaerator for deaerating liquids at temperatures below their flash temperature at atmospheric pressure, a receptacle containing a flash chamber, an inlet pipe for liquid to be treated entering into said flash chamber, a spray cone, means slidably supporting said cone relative to said inlet pipe, said inlet pipe and spray cone having cooperating valve surfaces thereon, and spring means for regulating the movement of said spray cone relative to said inlet pipe to maintain the velocity of sprayed liquid leaving said spray cone constant regardless of the quantity of liquid delivered to the spray cone by said inlet pipe, an inverted conical partition in said receptacle having its portion of smallest cross sectional area fitting snugly about said inlet pipe and its portion of largest cross sectional area fitting in fluidtight engagement against said receptacle to form a vapor receiving space isolated from the flash chamber, said inverted conical partition having openings therein near its uppermost part to permit entrance of vapor and gases into the isolated vapor space and an outlet means for vapor from the space within said partition.

2. In a low pressure low temperature deaerator, a receptacle forming a flash chamber and having an outlet at its bottom for deaerated liquids, a liquid inlet pipe extending into said flash chamber, an inverted spray cone, means connected to said inlet pipe and supporting said inverted spray cone about said inlet pipe for movement relative to the pipe, said inverted cone having its portion of smallest cross sectional area at the outlet of said inlet pipe whereby liquid entering the inverted spray cone will move upwardly through the cone in gradually increasing diffusion and will be sprayed from the open outlet end of the cone in a hollow gradually diverging spray, an inverted conical partition in said receptacle and having its lowermost smallest portion attached in fluidtight engagement with said inlet pipe above said inverted spray cone and its upper largest end attached in fluidtight engagement with the top of the receptacle, said partition having openings therein near its uppermost portion to permit vapor from the flash chamber to pass into the space within the partition, and an outlet for vapor from the space within said partition.

3. In a low pressure low temperature deaerator, a receptacle forming a flash chamber and having an outlet at its bottom for deaerated liquids, a liquid inlet pipe extending into said flash chamber, an inverted spray cone, means connected to said inlet pipe and supporting said inverted spray cone about said inlet pipe for movement relative to the pipe, said inverted cone having its portion of smallest cross sectional area at the outlet of said inlet pipe whereby liquid entering the inverted spray cone will move upwardly through the cone in gradually increasing diffusion and will be sprayed from the open outlet end of the cone in a hollow gradually diverging spray, an inverted conical partition in said receptacle and having its lowermost smallest portion attached in fluidtight engagement with said inlet pipe above said inverted spray cone and its upper largest end attached in fluidtight engagement with the top of the receptacle, said partition having openings therein near its uppermost portion to permit vapor from the flash chamber to pass into the space within the partition, and an outlet for vapor from the space within said partition, an impingement baffle carried by said partition above the outlet of said inverted spray cone and below the openings in said partition.

JOSEPH F. SEBALD.

REFERENCES CITED

The following references are of record in the file of this patent:

UNITED STATES PATENTS

| Number | Name | Date |
|---|---|---|
| 457,917 | Shaw | Aug. 18, 1891 |
| 519,083 | Garrison | May 1, 1894 |
| 1,401,101 | Ehrhart | Dec. 20, 1921 |
| 1,457,153 | Elliott | May 29, 1923 |
| 1,497,491 | Elliott | June 10, 1924 |
| 1,614,148 | Musselman et al. | Jan. 11, 1927 |
| 1,654,261 | Jones | Dec. 27, 1927 |
| 1,818,188 | Bergquist | Aug. 11, 1931 |
| 1,836,338 | Rodman et al. | Dec. 15, 1931 |
| 1,969,888 | Gibson | Aug. 14, 1934 |
| 2,047,291 | Rohlin | July 14, 1936 |
| 2,151,644 | Stephens | Mar. 21, 1939 |
| 2,238,572 | Sebald | Apr. 15, 1941 |
| 2,308,721 | Sebald | Jan. 19, 1943 |
| 2,315,227 | Rohlin et al. | Mar. 30, 1943 |
| 2,344,554 | McDermet | Mar. 21, 1944 |
| 2,392,197 | Smith, Jr., et al. | Jan. 1, 1946 |
| 2,393,328 | Mahone | Jan. 22, 1946 |